(12) United States Patent
Vogel et al.

(10) Patent No.: US 6,963,541 B1
(45) Date of Patent: Nov. 8, 2005

(54) UPSTREAM TRANSMISSION PROFILES FOR A DOCSIS OR DOCSIS-LIKE SYSTEM

(75) Inventors: Mark O. Vogel, Hampshire, IL (US); Stephen Maynard, Lake Zurich, IL (US)

(73) Assignee: 3Com Corporation, Marlborough, MA (US)

( * ) Notice: Subject to any disclaimer, the term of this patent is extended or adjusted under 35 U.S.C. 154(b) by 965 days.

(21) Appl. No.: 09/796,585

(22) Filed: Feb. 27, 2001

(51) Int. Cl.[7] ............................................. H04L 12/26

(52) U.S. Cl. ..................... 370/252; 370/490; 370/465; 370/487; 375/222; 725/111

(58) Field of Search .............................. 370/489, 443, 370/432, 465, 486, 487, 490, 442, 462, 252; 375/222; 725/111

(56) References Cited

U.S. PATENT DOCUMENTS

| | | | | |
|---|---|---|---|---|
| 6,160,843 A | * | 12/2000 | McHale et al. | 375/222 |
| 6,230,326 B1 | * | 5/2001 | Unger et al. | 725/111 |
| 6,236,678 B1 | * | 5/2001 | Horton et al. | 375/222 |
| 6,345,071 B1 | * | 2/2002 | Hamdi | 375/222 |
| 6,633,545 B1 | * | 10/2003 | Milbrandt | 370/252 |
| 6,650,624 B1 | * | 11/2003 | Quigley et al. | 370/252 |
| 6,735,245 B1 | * | 5/2004 | Palm | 375/222 |

OTHER PUBLICATIONS

Data-Over-Cable Service Interface Specifications (DOCSIS), Radio Frequency Interface Specification, Interim Specification, dated Jul. 24, 1998, Cable Television Laboratories, Inc.

* cited by examiner

Primary Examiner—Ricky Ngo
Assistant Examiner—Nittaya Juntima
(74) Attorney, Agent, or Firm—McDonnell Boehnen Hulbert & Berghoff LLP

(57) ABSTRACT

A message structure is provided for assigning transmission profiles to individual modems for modem transmissions in an upstream direction, on a modem by modem basis. The profiles define a set of transmission parameters, e.g., forward error correction information, symbol rate, frequency, modulation type, etc. that the modem should use to optimize their transmission in the upstream direction in order to maximize throughput. The invention is applicable to both wireless and land-based communications systems, particularly those adhering to the Data-Over-Cable Service Interface Specifications ("DOCSIS")—Radio Frequency Interface Specification standard, or other standards which are analogous to the DOCSIS standard. The message structure can consist of two parts—a first part that defines a plurality of different types of transmission profiles, and a second part that assigns a particular profile to a modem. In a DOCSIS embodiment, the first part is contained in a UCD packet and the second part is contained in a MAP packet.

8 Claims, 5 Drawing Sheets

| Type | Length | Profile #1 Definition |
|---|---|---|
| Type | Length | Profile #2 Definition |
| ... | ... | .... |
| Type | Length | Profile #n Definition |

200 / 202 / 204

| SID | IUC | Offset | Profile # |
|---|---|---|---|

100
300 / 302 / 304 / 306

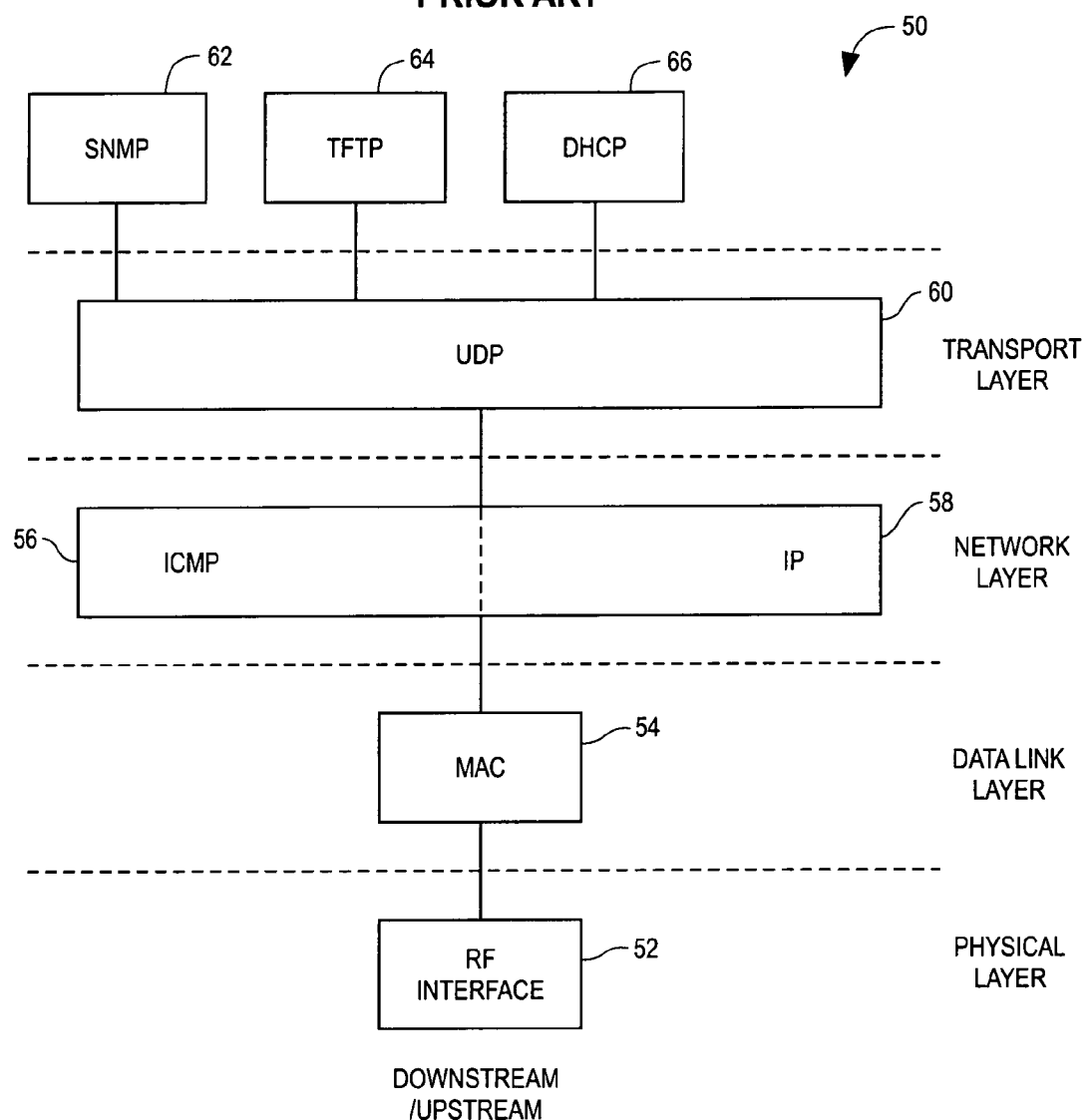

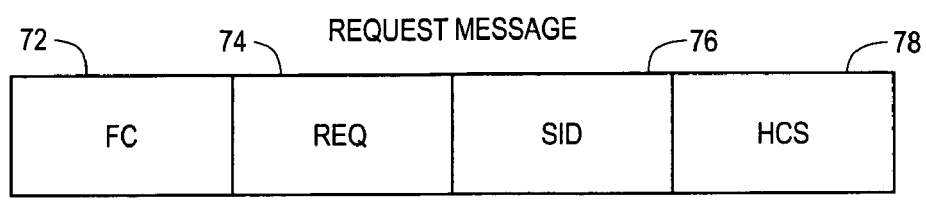
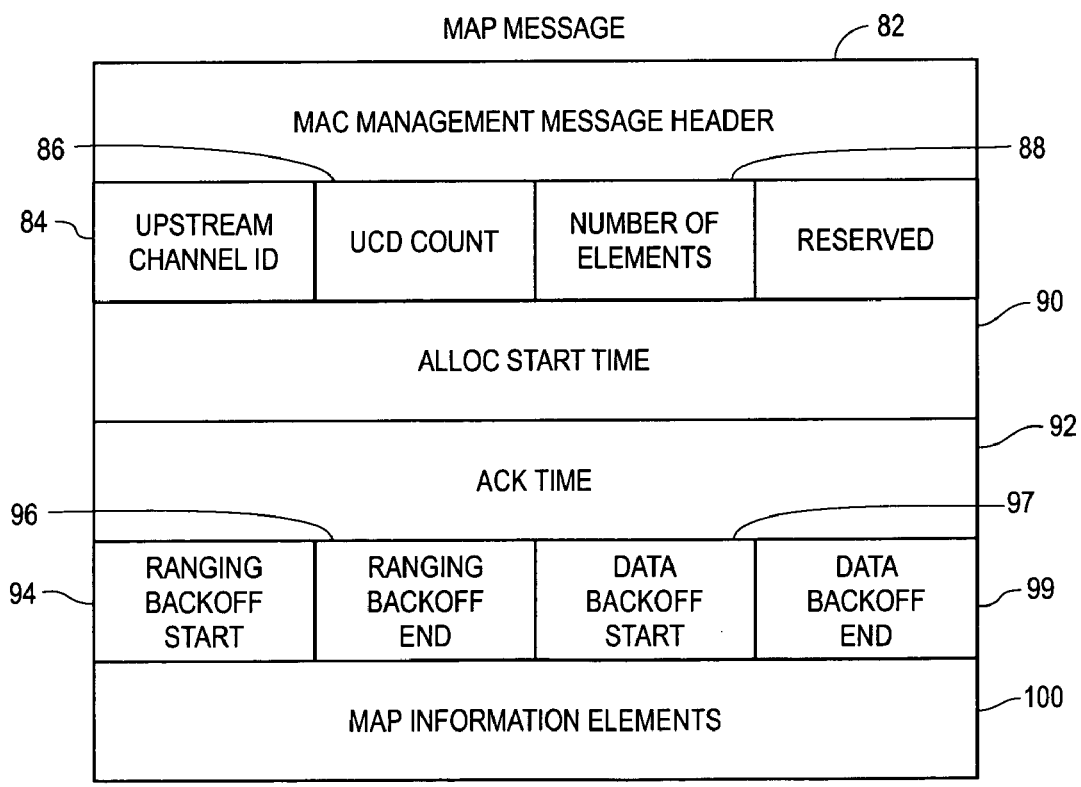

| Type | Length | Profile #1 Definition |
|------|--------|----------------------|
| Type | Length | Profile #2 Definition |
| ... | ... | .... |
| Type | Length | Profile #n Definition |

Figure 5

| Type 1 | Length 51-198 | |
|--------|---------------|---|
| Sub-Type 1 | Length 1 | Profile Basis |
| Sub-Type 2 | Length 1 | Symbol Rate |
| Sub-Type 3 | Length 4 | Frequency |
| Sub-Type 4 | Length 1-128 | Preamble Pattern |
| Sub-Type 5 | Length 1 | Modulation Type |
| Sub-Type 6 | Length 1 | Differential Encoding |
| Sub-Type 7 | Length 2 | Preamble Length |
| Sub-Type 8 | Length 2 | Preamble Offset Value |
| Sub-Type 9 | Length 1 | FEC Error Correction |
| Sub-Type 10 | Length 1 | FEC Codeword Information Bytes |
| Sub-Type 11 | Length 2 | Scrambler Seed |
| Sub-Type 12 | Length 1 | Maximum Burst Size |
| Sub-Type 13 | Length 1 | Guard Time Size |
| Sub-Type 14 | Length 1 | Last Codeword Length |
| Sub-Type 15 | Length 1 | Scrambler On/Off |

| Type 2 | Length 6 | | |
|---|---|---|---|
| Sub-Type 1 | Length 1 | Profile Basis = Profile 1 | |
| Sub-Type 9 | Length 1 | FEC Error Correction | |

| SID | IUC | Offset | Profile # |
|---|---|---|---|

300, 302, 304, 306

UPSTREAM TRANSMISSION PROFILES FOR A DOCSIS OR DOCSIS-LIKE SYSTEM

BACKGROUND OF THE INVENTION

A. Field of the Invention

This invention relates to the field of data communication. More particularly, the invention relates to transmission profiles that are assigned to individual modems in an upstream direction, on a modem by modem basis, to optimize their transmission in the upstream direction in order to maximize throughput. The invention is applicable to both wireless and land-based communications systems, particularly those adhering to the Data-Over-Cable Service Interface Specifications ("DOCSIS")—Radio Frequency Interface Specification standard, or other standards which are analogous to the DOCSIS standard.

B. Description of Related Art

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs"), and other computer networks via cable television networks. These cable modems currently support a data connection to the Internet and other computer networks via a cable television network with a data rate of up to 30+Mbps, which is a much larger data rate than can be supported by a modem used over a standard telephone line. Background information related to cable modem systems in general is described in the Data-Over-Cable Service Interface Specifications ("DOCSIS")—Radio Frequency Interface Specifications, issued by Cable Television Laboratories, Inc. This document, known to persons working in the art, is incorporated by reference herein in its entirety.

Data-over-cable systems may serve many cable modems simultaneously. A cable modem receives and transmits data in the form of digitally encoded radio frequency transmissions, which typically travel to and from the cable modem on, for example, coaxial cable. Also, the data-over-cable system consists of many branches from a common trunk, each branch serving a distinct group of cable modems, and the branches themselves may further divide into sub-branches. Thus the propagation of radio frequency signals to and from the cable modem often follows a circuitous and convoluted path. Transmissions from the cable modem are terminated in a cable system head-end by a device known as a Cable Modem Termination System or CMTS.

The current DOCSIS specification uses two types of message structures to describe when and in what manner a cable modem can transmit information on an upstream channel, i.e., in the direction from the cable modem to the CMTS. They are an Upstream Channel Descriptor (UCD) and an Upstream Bandwidth Allocation Map (MAP).

The UCD specifies the transmission characteristics of a given upstream channel. In particular, it specifies two aspects of an upstream transmission: channel specific items and burst specific items. Channel specific items or parameters are those that are common to all bursts of data, such as the operating frequency, the symbol rate, and the preamble pattern. Burst parameters, on the other hand, are specific to a given burst type, and include such characteristics as the modulation type, error correction parameters, and burst size. DOCSIS defines burst types by the purpose of the upstream transmission. These purposes are defined by a set of codes, known as Interval Usage Codes (IUC). The defined usage codes include "Requests", "Requests/Data", "Initial Maintenance", "Station Maintenance", "Short Data Grant", "Long Data Grant", and "Data Acknowledgment."

While UCDs thus describe the transmission characteristics of the channel, the MAP message structure defines the timing and control of the actual upstream data transmission. The MAP message structure includes one or more information elements (IE) fields, each of which defines a burst of transmission. Each IE within the MAP defines what modem or modems can transmit (through a service identifier), what type of transmission is allowed (via the IUC), and how long the transmission interval is.

The DOCSIS system is limited in its applicability to other transmission media besides cable because it defines transmission by the type of transmission only. DOCSIS assumes a channel has common transmission characteristics for all modems. It lacks the capability to also define transmission based on the quality of an individual upstream transmission path. That is, it does not readily enable adaptive modulation, namely the varying of the upstream transmission characteristics on a burst by burst and modem by modem basis in response to the current channel conditions. This situation prevents the maximization of upstream transmission on a per modem basis, since DOCSIS systems must be configured to support the lowest performing link.

For example, assume that modem A has a bad upstream transmission path, while modem B has a clean transmission path (while not probable in a wired environment, it is highly probably in a wireless environment). Because the UCD under the current DOCSIS regime only allows one transmission characteristic definition for a particular transmission type, all modems, regardless of the link quality, must use the same transmission format. Because modem B has a cleaner path, it could transmit data at a higher rate than modem A. However, because of the way the UCD is defined, it must use the same data rate as modem A. Since it is not practical to change the UCD from burst to burst (since it wastes downstream bandwidth, and the modem must continually process new UCD characteristics), this remains a limitation. Alternatively, additional IUCs could be created, but their basic function of defining the transmission type is still needed.

The present invention solves this problem by recognizing that the UCD and MAP format can be modified to specify upstream transmission characteristics on a burst by burst and modem by modem basis. This can be achieved by having the UCD define "transmission profiles." The profiles, as explained below, are a set of defined transmission parameters. One of the profiles is assigned to the modem, hence it tells the modem how to configure itself in an optimum and individual fashion, independent of other modems. The UCD thus defines profiles, instead of channel and burst characteristics, and the MAP IEs include profile assignments as is described below. This feature makes the DOCSIS message scheme extensible to other transmission media besides cable, particularly those where transmission characteristics and transmission parameters vary, such as wireless.

SUMMARY OF THE INVENTION

Truly adaptive modulation is possible in a DOCSIS or DOCSIS like system in accordance with the present invention. In particular, the present invention provides methods and apparatus for customizing upstream transmission for individual modems based on actual transmission characteristics in the upstream path. The invention can be used in either a wireless or wired system, e.g., a cable modem system.

In accordance with a preferred embodiment, a method is provided for connecting a plurality of modems to a network over a transmission medium, in which the transmission medium has different transmission characteristics for different modems in the plurality of modems. The method includes the step of transmitting messages to the modems in which the messages assign a specific upstream transmission profile to the modems based on transmission characteristics for the modems on a modem-by-modem basis. The modems responsively configure themselves in accordance with the transmission profile and transmit in the upstream direction in accordance with the transmission profile.

The message structure can consist of a single packet, or may be broken into two packets. In either case, preferably the message comprises two portions: a first one which defines a plurality of transmission profiles and a second portion assigning a specific transmission profile for the modem to use. Techniques are described below for compressing the amount of data needed to define a plurality of transmission profiles. In the situation where two packets are used, a DOCSIS type system can transmit the definitions of the profiles in a first packet (e.g, a UCD packet) and assign the profile to the modem in a second MAP packet.

Since customized modem configuration is achieved, the messages could be issued in a iterative fashion specifying increased transmission speeds for the modems until an optimal level is reached. This is particularly useful when a modem is initialized, where a modem may start out initially at a slow speed and with a robust forward error correction regime in place, and the messages may be used to gradually increase speed and reduce the forward error correction profile until an optimal upstream transmission level is reached.

The node or entity that assigns transmission profiles may vary. In a cable modem embodiment, this node is the cable modem termination system (CMTS). In a wireless embodiment, the node could be an Interworking Function (IWF), Foreign Agent, wireless base station controller, wireless modem termination system (WMTS), or any other suitable wireless network entity that has access to transmission characteristics and is a logical place to control upstream transmission profiles for remote modems.

In another aspect of the invention, a network node is provided which is adapted for optimizing transmission from remote modems to the node over a communications medium (e.g., wireless). The node includes a memory storing a plurality of defined transmission profiles for the remote modems. The transmission profiles identifying particular upstream transmission characteristics that the modems may potentially use when transmitting in a direction from the remote modem to the node. The node also includes a software process for generating at least one packet for transmission to the remote modems. The least one packet contains the defined transmission profiles and assigns one of the transmission profiles to an individual one of the modems. The node further includes an interface for transmission of the at least one packet from the node to the remote modems.

As noted above, the at least one packets could be a single packet, or, in a DOCSIS system, could be two packets, one containing a UCD defining the profiles and the other a MAP packet assigning one profile to the modem to use.

In another aspect, the invention provides a cable modem having software processing a upstream channel descriptor packet and responsively identifying a plurality of upstream transmission profiles contained in the upstream channel descriptor packet. The modem further includes software processing a bandwidth allocation map packet and responsively identifying a particular transmission profile of the plurality of profiles to be used by the modem in transmission in an upstream direction; and a processor responsively configuring transmission characteristics for the modem in accordance with the particular transmission profile. In the illustrated embodiment, the modem can be a cable modem or a wireless modem, and is part of a communications system compliant to the DOCSIS standard.

Further details on these and other aspects of a presently preferred embodiment will be appreciated more fully by reference to the following detailed description.

BRIEF DESCRIPTION OF THE DRAWINGS

The following detailed description makes reference to the appended drawings, in which:

FIG. 2 is a block diagram illustrating a protocol stack for a cable modem in the data-over-cable system depicted in FIG. 1;

FIG. 3 is a block diagram illustrating a structure of a Request message that may be transmitted by a cable modem in the data-over-cable system of FIG. 1;

FIG. 4 is a block diagram illustrating the structure of a MAP message transmitted by a CMTS in the data-over-cable system of FIG. 1;

FIG. 5 is an illustration of a UCD message structure which provides for upstream a channel transmission profile definitions, which can be assigned to modems on an individual basis;

FIG. 6 is an illustration of a compound UCD message structure in which transmission profile type # 1 is subdivided into 15 different defined profile parameters, including symbol rate, frequency, modulation type, and so on; it will be appreciated that the profile parameters will vary as needed for different encoding methodologies and different types of transmission media;

FIG. 7 is an illustration of a second profile definition, which is based on the profile type # 1 shown in FIG. 6 but has only one changed parameter, forward error correction; and FIG. 8 is an illustration of a modified Information Elements (IE) message structure, contained within a bandwidth allocation map (MAP) message in the DOCSIS system, in which the IE message contains a field for containing data identifying a profile number for the modem to transmit in accordance with in the upstream direction.

DETAILED DESCRIPTION OF THE PREFERRED EMBODIMENT OF THE INVENTION

Figure 1:
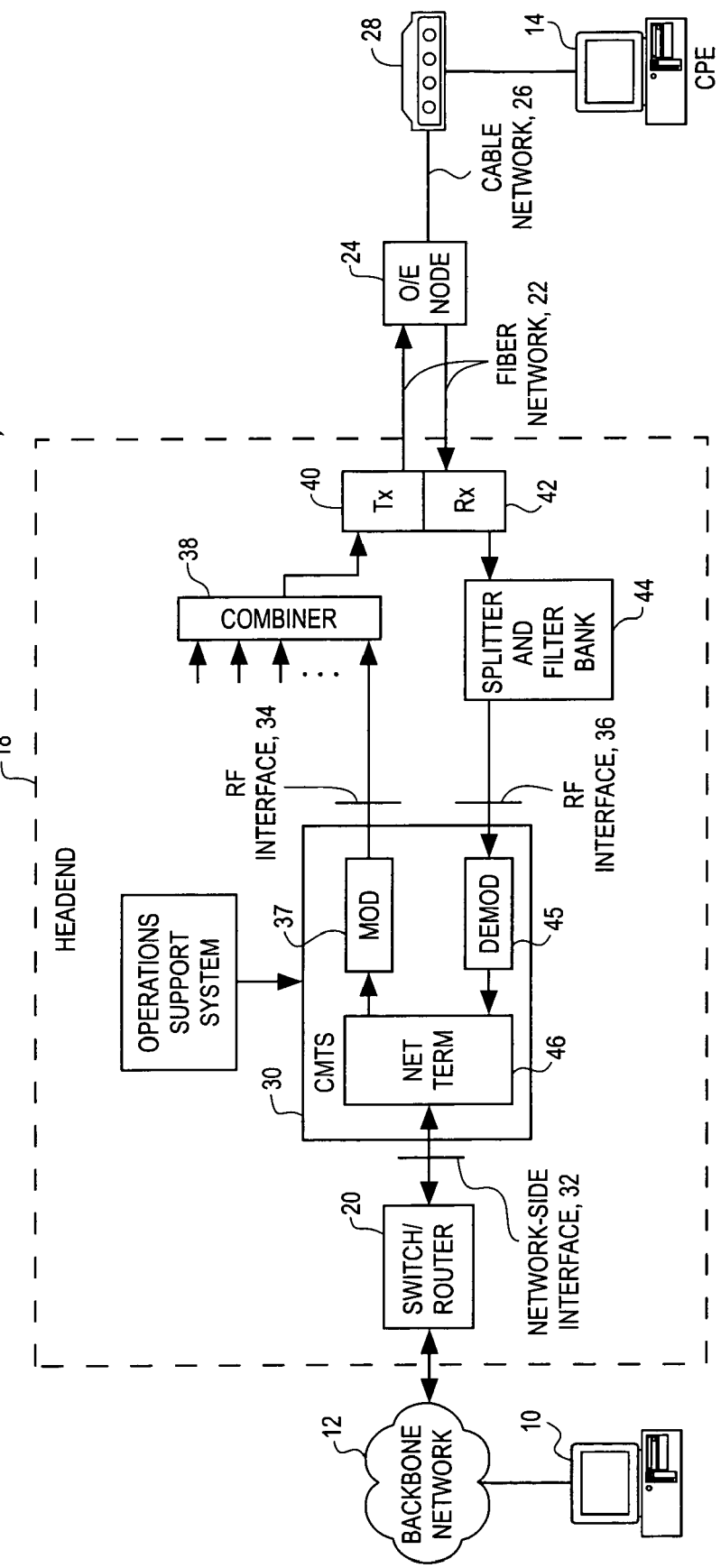
FIG. 1 is a block diagram illustrating a basic architecture for a data-over-cable system.

The present invention will be described in conjunction with a data-over-cable system compliant to the DOCSIS standard. However, the invention is applicable to other types of communications systems which use a different set of standards. The common idea is that some node or network entity in the communications network (the CMTS in the data-over-cable system) assigns transmission profiles to individual modems for transmission in the upstream direction in accordance with a messaging protocol either identical to or analogous to that described herein. The invention is particularly suited to the situation in which individual modems will have transmission characteristics in the upstream direction that vary widely from modem to modem, as can be the case with wireless. While the DOCSIS system message protocol described below is specifically applicable to DOCSIS and data-over-cable systems, the invention is applicable also to wireless and other media (and the protocols used therein) either directly or by analogy.

FIG. 1 is a block diagram illustrating the basic overall architecture of a data-over-cable system. The system of FIG. 1 provides a mechanism by which a computer 10 connected to a backbone network 12, either directly or indirectly by intermediate networks, may communicate with another computer 14 via a data-over-cable infrastructure indicated generally by reference numeral 16. The cable television infrastructure 16 includes a distribution hub or "head-end" 18 that is connected to the backbone network 12 via a switch or router 20. The cable system head-end 18 is typically a central location in the cable television network that is responsible for sending cable signals in the downstream direction as defined below. The head-end 18 modulates digital data from the backbone network 12 into analog form and supplies the analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem ("CM") 28 demodulates the analog signals, extracts the digital data, and supplies the data to the customer premise equipment ("CPE") 14. The CPE 14, in a typical situation, is a general purpose computer in a home environment but may alternatively be a multimedia display device or a point-of-sale terminal in a store, the details of which are not important.

The head-end 18 includes a cable modem termination system ("CMTS") 30. This device provides a network side interface to a wide area network, indicated at 32, and a radio frequency ("RF") interface between the CMTS 30 and the cable network in both the downstream and upstream directions, indicated respectively at 34 and 36. As used in the present document, the term "downstream" refers to transmission in the direction from the head-end 18 or CMTS 30 to the cable modem 28 at the customer premises. The term "upstream" refers to transmission in the direction from the cable modem 28 to the CMTS 30.

For transmission in the downstream direction, the CMTS 30 supplies data received from the computer 10 through the network 12 to a modulation circuit ("MOD") 37 and then to a combiner 38, which combines the data with video signals for the cable television system. The combined signals are sent to a transmission module 40 where they are imparted onto the fiber network 22.

In a typical two-way cable system, also termed a bidirectional cable system, a cable modem 28 will transmit data packets to the CMTS 30 over one or more upstream channels on the cable television network 22 and 26. In the upstream direction, the cable modem 28 transmits data from the CPE 14 over the cable network 26 and 22, which is received at a receiver module 42. The receiver module 42 couples the upstream signal to a splitter and filter bank 44 which separates the data signal from video signals for the cable television system and couples the data signal to a demodulation circuit ("DEMOD") 45 as in the CMTS 30. A network termination unit 46 processes the data, sends the data to the switch or router 20, and routes the data onto the network 12 for transmission to the remote computer 10.

A data packet may carry, as its payload, information that is sent from the CPE 14 and destined for the CMTS 30. The cable modem 28 adds overhead to the data packet to maintain the integrity of the payload. Examples of overhead include redundant bits for error correction and preambles. On the cable network 22 and 26 side of the cable modem 28, the cable modem 28 transmits from and receives the data packet and overhead in the form of digitally modulated radio frequency carriers. An exemplary bi-directional data-over-cable system includes customer premises equipment 14 (e.g., a customer computer), a cable modem 28, a CMTS 30, a cable television network 18, 22, 26, and a backbone data network 12 (e.g., the Internet).

Cable Modem Protocol Stack

FIG. 2 is a block diagram illustrating a protocol stack 50 for the cable modem 28. FIG. 2 illustrates the downstream and upstream protocols used in the cable modem 28. As is known in the art, the Open System Interconnection ("OSI") model may be used to describe computer networks. The OSI model consists of seven layers including, from lowest-to-highest, a physical, data-link, network, transport, session, presentation and application layer. The network layer places routing information into the data packets. The data link layer transmits data packets. The physical layer transmits the data packets and overhead as bits over a communication link.

For data transmission over a bi-directional data-over-cable system, the cable modem 28 connects to the cable network 26 in a physical layer via a radio frequency ("RF") interface 52. In an exemplary preferred embodiment of the present invention, the RF interface 52 has an operation frequency range of approximately 50 Mega-Hertz ("MHz") to 1 Giga-Hertz ("GHz") and a channel bandwidth of 6 MHz on the downstream channels. In another exemplary preferred embodiment of the present invention, which relates to a bi-directional data-over-cable system, the RF interface 52 has an operation frequency range of approximately 5 MHz to 42 MHz on the upstream channels. However, other operation frequencies and bandwidths may also be used and the invention is not limited to these frequencies and bandwidths. The RF interface 52 preferably uses a signal modulation method of Quadrature Amplitude Modulation ("QAM"), although other methods may alternatively be used. As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

The RF interface 52 uses QAM-64 or QAM-256 for downstream transmission. The upstream transmission uses QAM-16 or Quadrature Phase-Shift-Keying ("QPSK"). For the upstream embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates may alternatively be used. However, other RF interfaces 52 could also be used and the present invention is not limited to interfaces complying with DOCSIS.

Referring again to FIG. 2, above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. However, other MAC layer 54 protocols may alternatively be used and the preferred embodiments are not limited to DOCSIS MAC layer protocols.

Above both the downstream and upstream data-link layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. Additional information on the IP 58 may be found in the Internet Engineering Task Force ("IETF") standard Request For Comments ("RFC") 791—Internet Protocol, dated September 1981, incorporated herein by reference.

Also within the network layer of the protocol stack 50, an Internet Control Message Protocol ("ICMP") layer 56 is used for network management. The main functions of the ICMP layer 56, hereinafter ICMP 56, include error reporting, reachability testing (e.g., "pinging"), congestion control, route-change notification, performance, and subnet addressing. Since the IP 58 is an unacknowledged protocol, datagrams may be discarded and the ICMP 56 is used for error reporting. Additional information on the ICMP 56 may be found in IETF standard RFC 792-Internet Control Message Protocol, dated September 1981, incorporated herein by reference.

Above the IP 58 and the ICMP 56 is a transport layer with a User Datagram Protocol ("UDP") layer 60. The UDP layer 60, hereinafter UDP 60, roughly corresponds to OSI layer 4, the transport layer, but is typically not defined as part of the OSI model. As is known in the art, the UDP 60 provides a connectionless mode of communication with datagrams. Additional information on the UDP 60 may be found in IETF standard RFC 768—User Datagram Protocol, dated Aug. 28, 1980, incorporated herein by reference. Transmission Control Protocol (TCP) may exist at this layer.

Above the network layer are a Simple Network Management Protocol ("SNMP") layer 62, a Trivial File Transfer Protocol ("TFTP") layer 64, and a Dynamic Host Configuration Protocol ("DHCP") layer 66. The SNMP layer 62 is used to support network management functions. Additional information on the SNMP layer 62 may be found in IETF standard RFC 1157—A Simple Network Management Protocol (SNMP), dated May 1990, incorporated herein by reference. The TFTP layer 64 is a file transfer protocol used to download files and configuration information. Additional information on the TFTP layer 64 may be found in IETF standard RFC 1350—The TFTP Protocol (Revision 2), dated July 1992, incorporated herein by reference. The DHCP layer 66 is a protocol for passing configuration information to hosts on an IP 54 network. Additional information on the DHCP layer 66 may be found in IETF standard RFC 2131—Dynamic Host Configuration Protocol, dated March 1997, incorporated herein by reference. More or fewer protocol layers could also be used with a data-over-cable system 16.

Upstream Data Transmission

A cable modem 28 typically transmits on an upstream channel during a transmission mini-slot allocated by the CMTS 30. The upstream channel may be viewed as time-divided into a stream of mini-slots, each of which is a unit of granularity for upstream transmission opportunities. The CMTS 30 also times the mini-slots to prevent collisions between the transmissions from different cable modems by instructing the cable modems 28 to transmit alternately during the mini-slots.

Before transmitting data, however, a cable modem 28 must first request permission to transmit from the CMTS 30. A cable modem 28 that wishes to transmit sends a Request MAC 54 message to the CMTS 30. FIG. 3 is a diagram illustrating a preferred structure of a Request message 70. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC 54 message. |
| REQ 74 | Total amount of bandwidth requested in mini-slots. |
| SID 76 | Service Identifier for the cable modem 28 that sent the REQ message. |
| HCS 78 | MAC 54 header check sequence. |

The SID 76 is a unique identifier for the cable modem 28 that is requesting permission to transmit. The SID 76 may be assigned by the CMTS 30 when the cable modem 28 initializes and registers with the CMTS 30 as discussed below. The REQ 74 field contains a measure of how much bandwidth, i.e. mini-slots, the cable modem 28 requests for the transmission of its data to the CMTS 30.

In response, the CMTS 30 builds an Upstream Bandwidth Allocation Map message 80 ("MAP") and transmits it via the downstream channel to all cable modems. Typically, the CMTS 30 receives requests from a number of cable modems that wish to transmit and may allocate one or more transmission mini-slots to each of the cable modems 28. The MAP message 80 then informs each cable modem 28 of its permitted mini-slot(s) for transmission. FIG. 4 is a block diagram illustrating the structure of a preferred MAP message 80. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgment time field 92 ("Ack Time"), a ranging backoff start field 94, a ranging backoff end field 96, a data backoff start field 97, a data backoff end field 99, and a MAP information elements field 100. Descriptions for the MAP message 80 fields are shown in Table 2.

TABLE 2

| MAP message 80 Parameter | Description |
| --- | --- |
| MAC 54 Management Message Header 82 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |

TABLE 2-continued

| MAP message 80 Parameter | Description |
|---|---|
| Ack Time 92 | Latest time, from CMTS 30 initialization, (mini-slots) processed in upstream. |
| Ranging Backoff Start 94 | Initial back-off window for initial ranging contention. |
| Ranging Backoff End 96 | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems 28 of the allocation of mini-slots for a scheduled upstream usage interval and when to begin the usage interval. In a given upstream usage interval, selections of the cable modems 28 alternately transmit on the upstream channel. As is known in the art, each upstream usage interval is composed of transmission intervals, also referred to as "bursts," which comprise at least one mini-slot.

The upstream channel identifier field 84 within the MAP message 80 includes an identifier for the upstream channel to which the MAP message 80 applies. As is known to those skilled in the art, the data-over-cable system 16 may support upstream transmission on more than one upstream channel. For example, a common head-end 18 may serve more than one branch of HFC paths 22–26, and each branch may require a unique upstream channel for reasons of network configuration. In such a case, the Upstream Channel ID 84 may distinguish between the branches. Thus, the MAP message 80 intended for the cable modems 28 served by one branch may be distinguished from the MAP messages 80 for cable modems 28 on other branches by use of the Upstream Channel ID 84.

The MAP Information Elements field 100 designates the order and duration of the transmissions from the cable modems 28 for the upstream channel. As described in DOCSIS, one element may describe each transmission. The Number of Elements field 88 contains the total number of such elements. A preferred embodiment for the field 100 is set forth below.

Additional background information is contained in the DOCSIS RFI specification, and the reader is directed to that documents for further details.

Upstream Channel Descriptor (UCD) Definition of Profiles

The current DOCSIS UCD consists of a MAC management header, four fixed fields (upstream channel ID, configuration change count, mini-slot size, and downstream channel ID), and a series of Type—Length—Valude (TLV) messages. These TLV messages define the channel attributes, and the burst attributes. The channel attributes define the characteristics that are common to all upstream transmissions, and the burst attributes define the characteristics that will vary on a burst by burst basis.

As noted above, heretofore burst transmission characteristics were based only on the usage of the channel (request, data, maintenance, etc.), not the actual performance capability of the upstream link. To overcome this limitation, the TLV format of the UCD can be modified to enable the definition of transmission profiles that will be based on characteristics of the channel. To do this, a compound TLV format will be used with the message structure shown in FIG. 5. Basically, the TLV format consists of type fields 200 consisting of a one byte word, one byte length fields 202, and defined transmissions set forth in the variable length value field 204. In this structure, the "type" field would define the profile number, thus type 1 would represent profile #1, type 2 profile #2, etc.

In a preferred embodiment, the actual definition of the profile occurs in the sub-TLVs of the definition portion of the compound TLV of FIG. 6. The first element in the definition portion would be the "basis" sub-TLV. The designation "basis" provides the link or reference to the profile that this profile is based upon, and enables UCD compression (i.e. reduction of the UCD data required). For Profile 1, shown in FIG. 6, the profile basis 208 is null since the profile is completely defined, i.e., not based on any other profile. For type 1, all the various parameters for that profile are completely defined, by the use of subtypes 1–15 within type 1 (type field 200), and the various parameters set forth in the definitions field 204.

It is possible for the remainder of the profiles to be defined in terms of variations from a previously defined profile. For example profile #2 might be based on profile #1, with the only difference being an increased FEC. Instead of profile #2 listing all of the elements found in profile #1 with the FEC changed, it would simply reference profile #1 and list the modified FEC parameter. By doing this redundant information can be eliminated from the UCD and thus minimize the size of the UCD and memory requirements in the modem, hence UCD compression. As shown in FIG. 7, the profile # 2 has the basis field 208 with a reference to profile # 1. Since the forward error correction is different, the profile includes sup-type 9 and a new value of the forward error correction parameter, as indicated at 210. The format of FIGS. 6 and 7 can thus be used to define any number of profiles, including those that are completely specified and those that are based on other completely specified profiles but have changes to one or more parameters in the profile.

The elements that would go into the definition of the profiles would vary based on the media that the system would operate over. For cable networks, the same elements currently defined in DOCSIS could be used as shown in the profile definition shown in FIG. 6. For other media, the types in the profile definition could be redefined or added/subtracted as needed to encompass different encoding methodologies.

It will be understood that the CMTS of FIG. 1 includes a memory storing the various profile types and generates UCD packets that contain these profiles and transmits them to the cable modems. Furthermore, the cable modems contain software for processing UCD packets, parsing the packets to extract the available profiles. These profiles could be stored in memory or processed anew for each new UCD packet.

Now that the definition of the profiles and manner of communicating the profiles to the modems has been described, we now describe a preferred method of how an individual profile is assigned to a modem in a DOCSIS or DOCSIS like system.

MAP Definition for Transmission Profiles

As shown in FIG. 4, the current DOCSIS MAP 80 consists of a MAC management header, ten fixed fields (upstream channel ID, UCD count, # of elements, reserved, allocation start time, acknowledgment time, ranging backoff start, ranging backoff end, data backoff start, data backoff end), and a series of ILEs. Each IE consists of a Service ID (SID) which specifies which modem(s) can transmit in the interval, the IUC which specifies the type of transmission in the interval (request, data, maintenance, etc.), and an offset which specifies the time at which transmission should occur. Again, because the current MAP structure bases transmission on the interval usage type, changing transmission based on channel characteristics is not readily feasible using prior art approaches.

To overcome this limitation, a profile field is added to each IE 100, resulting in a modified IE message structure shown in FIG. 8. The IE message structure consists of the SID 300, the IUC 302, the offset 304, and the profile # field 306. The profile number field 306 thus contains a specific identification of a transmission profile (e.g., profile # 2) for the modem to use in the upstream communication associated with the MAP containing this IE.

In this embodiment, two packets are used: a UCD to define the profiles and a MAP to assign a profile to a modem. These could be combined into a single packet or remain as two separate packets.

When a modem gets a transmission opportunity, it will adjust its transmission characteristics based on the profile # contained in the IE field 100 of the MAP (with the profile description defined in the UCD of FIGS. 5–7 in the illustrated embodiment), and not merely based on the interval usage code (IUC). It is now possible to have two modems transmit with different transmission characteristics, even though they both have the same IUC.

Modem Performance

One of the additional capabilities enabled by a new UCD and MAP format, as described above, is that the transmission characteristics of each modem can be independently optimized for their specific reverse path conditions, whereas without this ability all modems are restricted to transmit using the characteristics of the modem with the worst reverse path conditions. In a wireless environment, when a modem initializes on the network, the profile assigned would be one that is very robust (low speed/high forward error correction) since the conditions of that modem's reverse path are not known. During the ranging process, the CMTS can determine if the modem can operate with a less robust (higher speed/lower forward error correction) profile by looking at the measured signal to noise ratio or error rate of the modem's transmissions. If it is determined that the modem can operate at a higher speed, this process can be repeated, with assigned profiles increasing in speed, until a given level of optimization is achieved. This can be done independently for each modem.

Because of the need to keep the UCD to a reasonable size, it is not likely that each modem will have its own unique profile. Rather, a likely implementation will be a series of profiles that range in robustness, from very low to very high, and groups of modems will be assigned a profile in the pool based on their reverse path conditions.

While presently preferred embodiments of the invention have been described with particularity, persons skilled in the art will appreciate that variation from the specifics of the preferred embodiment are possible without departure from the spirit and scope of the invention. This scope of the invention is to be determined by reference to the appended claims, interpreted in view of the foregoing description.

What is claimed is:

1. A method of connecting a plurality of modems to a network over a transmission medium, in which the transmission medium has different transmission characteristics for different modems in said plurality of modems, comprising the steps of:
   a) transmitting messages to said modems wherein said messages assign a specific transmission profile to said modems based on transmission characteristics for said modems on a modem-by-modem basis; wherein said messages comprise a first portion defining a plurality of transmission profiles and a second portion assigning a transmission profile for said modems to use, and wherein said messages are issued in an iterative fashion specifying increased transmission speeds for said modems until an optimal level is reached;
   b) configuring said modems in accordance with said transmission profiles; and
   c) said modems transmitting in an upstream direction in accordance with said transmission profiles.

2. A node in a network performing step a) of claim 1.

3. The node of claim 2, wherein said node comprises a cable modem termination system.

4. A network node optimizing transmission from remote modems to said node over a communications medium, comprising:
   a memory storing a plurality of defined transmission profiles for said remote modems, said transmission profiles identifying particular upstream transmission characteristics that said modems may potentially use when transmitting in a direction from said remote modems to said node; and
   a software process for generating at least one packet for transmission to said remote modems, said at least one packet containing said defined transmission profiles and assigning one of said transmission profiles to an individual one of said modems; and
   an interface for transmission of said at least one packet from said node to said remote modems;
   wherein said at least one packet comprises a first portion defining a plurality of transmission profiles and a second portion assigning a transmission profile for said modems to use, and wherein said at least one packets are issued in an iterative fashion specifying increased transmission speeds for said modems until an optimal level is reached.

5. The node of claim 4, wherein said node comprises a cable modem termination system.

6. The node of claim 4, wherein said node comprises a node of a wireless network.

7. The node of claim 4, wherein said node comprises a node of a communication system compliant to a DOCSIS standard.

8. The node of claim 7, wherein said at least one packet comprises an upstream channel descriptor packet containing said defined transmission profiles and a bandwidth allocation map packet containing a field assigning one of said transmission profiles to each of said modems.

* * * * *